COMMUNICATIONS ECHO SUPPRESSION

Filed May 13, 1964

INVENTOR.
LEONARD R. KAHN
BY Mathis & Graybeal
ATTORNEYS

United States Patent Office 3,370,294 Patented Feb. 20, 1968

3,370,294
COMMUNICATIONS ECHO SUPPRESSION
Leonard R. Kahn, 81 S. Bergen Place, Freeport, N.Y. 11520
Filed May 13, 1964, Ser. No. 367,085
7 Claims. (Cl. 343—180)

Figures 1, 2, 3:
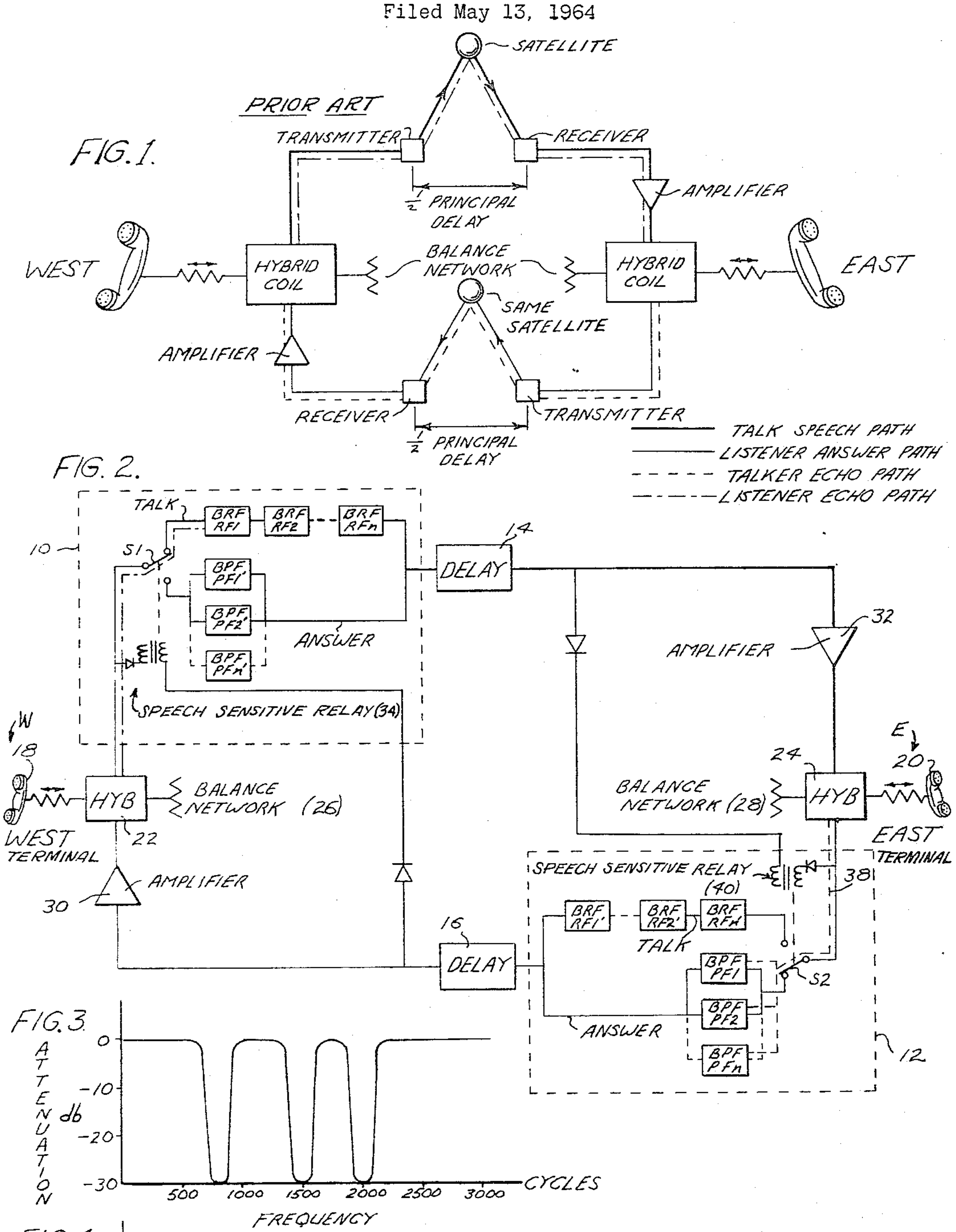

The present invention relates to echo suppression means for speech communication systems, and more particularly to echo suppression circuitry especially adapted to provide simultaneous transmission of speech signals in both directions during periods of "double talking," i.e. when both communicants are talking at the same time.

"Echo," in its delayed form, is undesirable, except on short connections where the propagation time is too small to give audible separation of the direct and reflected components. For circuits with moderate delays, such as transcontinental connections, the delay is of the order of several tens of milliseconds (msec.). This is sufficient to give noticeable separation in the form of audible echo. Echo in circuits with moderate delays can be adequately controlled by the use of conventional echo suppressors which tend to act as one-way switches, allowing one of the parties to "capture" the circuit, depending on the relative signal levels that each develops at the suppressor terminals. The other side of the circuit is automatically shorted out so that any signal crossing over to it cannot be returned to the transmitting end of the circuit. This type of operation interferes with the free flow of simultaneous conversation in both directions. For the relatively short delays of most present day circuits, which delays are on the order of about 45 to 100 msec., such interference is not particularly disadvantageous, and echo suppressors of this type perform rather satisfactorily. However, in speech communication systems wherein the delay may be of the order of several hundred msec., such as in satellite communications systems for example, conventional echo suppressors are unsatisfactory. For a Honolulu-to-London call by way of two 6000-mile high ocean-spanning satellites and a 3000-mile transcontinental microwave link, a round trip delay of about 400 msec. would be involved. For two synchronous or "24-hour" satellites, the round trip delay would increase to approximately 1100 msec. In speech-communications systems involving delays of these magnitudes, the use of a conventional echo suppressor, which cuts out the return path, would slow down conversation and/or cause misunderstandings between the parties. In such systems it is highly desirable to provide at least some degree of transmission in both directions during periods of double talking.

Recent comprehensive articles dealing with the echo suppression problem and various prior echo suppression techniques appear in The Bell System Technical Journal, issue of November 1963, at pp. 2869–2891 ("The Effects of Time Delay and Echoes on Telephone Conversations," by J. W. Emling and D. Mitchell), at pp. 2893–2917 ("Echo Suppressor Design in Telephone Communications," by P. T. Brady and G. K. Helder), and at pp. 2919–2941 ("Subjective Evaluation of Delay and Echo Suppressors in Telephone Communications," by R. R. Riesz and E. T. Klemmer).

Reference is also invited to an article by March B. Gardner and John R. Nelson, entitled, "Combating Echo in Speech Circuits With Long Delay," and published in the Journal of the Acoustical Society of America, issue of November 1963, vol. 35, No. 11, pp. 1762–1767. This latter article, involving a study of echo problems in satellite communications systems, suggests normally introducing total attenuation in the return side of the circuit and then reducing the attenuation when the second party wants to interrupt, which to some extent improves operation but is not a complete solution to the problem.

In connection with the problem of transmitter and receiver isolation in a two-way radio telephone communications system, a technique is disclosed in Stroud et al., U.S. Patent No. 3,022,504 in which voice feedback is minimized by restricting the transmitted audio signal to certain frequency subbands making up half the audio signal spectrum, then restricting the return audio signal to the frequency subbands excluded from the transmitted signal. With both the "talker" and "listener" circuits relatively equal in quality, or lack thereof, the Stroud et al. system cannot derive any advantage from and does not use the conventional return path attenuation means (e.g. switching) normally employed in long distance telephone circuits. As will be apparent, and as readily determinable by test, the restriction of the transmitted or "talker" voice signal of a telephonic transmission to but half of its frequency components necessarily and inherently renders the voice signal so unnatural and relatively inarticulate as to severely detract from the usefulness of the circuit. In contrast to the Stroud et al. technique, it is an essential and important characteristic of the echo suppression system of the present invention that the transmit or "talker" signal path passes at least about twice as many frequency components, and preferably at least about five to twenty-five times as many frequency components as does the receive or "listener" circuit, with the transmit and receive passbands being mutually exclusive. By this technique a much more practical echo suppression is realized since (*a*) talker controlled switching is retained to attenuate the more or less low level feedback of background noise such as line hum and the like; (*b*) a voice signal feedback condition is obviated since the transmit and return passbands are mutually exclusive, or principally so; (*c*) by reason of the return path passbands the return path is not completely silent since there is at all times some return path feedthrough of some of the frequency components originating at the receive end, so the operationally disconcerting condition of total return path silence is avoided; (*d*) the voice signal originating at the transmit end is received in a condition to be natural sounding and articulate, in that the transmit passband permits reception of a markedly predominant proportion of the frequency components of the voice signal input; and (*e*) the system is compatible with and can be simply and readily applied to existing as well as new telephone facilities in that only appropriate switching and filters need be added, and conventional and normally used equipment, such as the mutual inductance bridges, need not be removed or modified.

A principal object of the present invention is the provision of echo suppression circuitry which effectively attenuates undesirable echo to where it is no longer disturbing, or even essentially eliminated altogether, while at the same time permitting "double talking" to the extent of a natural and articulate transmission of a speech signal in one direction, with simultaneous transmission of a recognizable speech signal in the reverse direction.

The techniques employed by the invention are based in part upon the fact there is an appreciable redundancy in the voice spectrum. As used herein, the terms "voice spectrum" and "audio spectrum" are used in the conventional sense, with reference to the spectrum of audio frequencies in the range of 200 to 3,000 cycles per second.

Voice energy is characteristically a complex wave having a large number of frequency components, in most instances. Most but not all of the frequency components of a complex voice signal are required to transmit voice intelligence with an adequate degree of articulateness and naturalness. I have found that, in conjunction with conventional echo suppression switching, when the transmit and receive passbands are mutually exclusive and the transmit passband includes a heavily predominant proportion of the frequency components of the voice spectrum, the normal "talker" transmission is both articulate and natural yet there is a sufficient passband for any "listener" or return voice transmission so that the return voice transmission is understandable or at least recognizable by the "talker" as an attempt on the part of the "listener" to respond and/or assume control of the circuit. I have further found that the passband of the "talker" circuit should include substantially all frequency components below about 600 cycles and should include at least about twice and preferably about five to twenty-five times as many frequency components as the "listener" circuit. I have further found the passband frequencies excluded from the "talker" circuit and included in the "listener" circuit should be in a few (not more than about three) relatively narrow band (e.g., 50–100 cycles) frequency segments which are rather widely separated from each other (e.g., centered on 800, 1,500 and 2,000 cycles, for example) and preferably not harmonically related.

Echo suppression circuitry according to the present invention functions in a manner similar to conventional echo suppressors in that the party speaking (or the principal speaker if both parties are speaking at the same time) "captures" the circuit. However, instead of the return side of the circuit being completely opened or shorted out, a switching relay inserts one or more narrow bandpass filters into the return channel, allowing the listening party to answer and at least make himself heard over what amounts to a relatively poor quality circuit. The answer signal is attenuated by the narrow bandpass filters but not to the extent that the other party cannot hear any signal at all. According to one aspect of the invention, the talker's speech wave may be treansmitted in its entirety to the listener, in which case some of the talker echo would be returned to the talker, because the narrow bandpass filters pass a portion of any signal which they receive, including the echo signal. However, the narrow bandpass filters remove most of the frequency spectrum, enough so as to effectively attenuate the echo signal (which is to begin with a relatively weak signal), to a level where it is no longer disturbing.

According to another aspect of the invention, echo signals can be eliminated substantially in their entirety by the insertion of a complementary group of band reject filters into the captured channel of the circuit so that there is no complete round trip path for any voice frequency, and hence no echo path. In such a system the band reject filters in the captured channel pass a predominant portion while rejecting (i.e. blocking) certain minor segments of the speech wave fed to them, and the narrow band bandpass filters in the other channel only the minor segments of the speech wave fed to them which correspond to the segments rejected (i.e. blocked) in the captured channel. The use of the band reject filters in the captured channel does not appreciably degrade the quality of the speech, because as previously pointed out, not all of the components of a speech wave need to be heard in order to understand a voice message.

Figure 4:
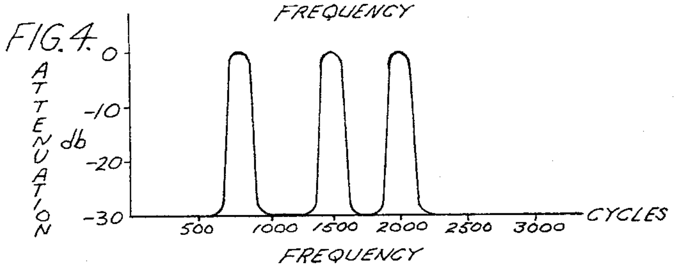

These and other objects, features and advantages of the present invention will be apparent to those skilled in the art from the following description of a typical and therefore nonlimitive embodiment thereof, which description makes reference to the accompanying drawing, wherein:

FIG. 1 is a simplified schematic diagram of a telephone communication system involving a satellite relay link as the principal source of delay, such view serving to diagrammatically illustrate the manner in which an echo is generated when no echo suppression means is employed;

FIG. 2 presents a block diagram like FIG. 1, but including a typical form of echo suppression circuitry according to the present invention, such view showing the circuit "captured" by the west terminal;

FIG. 3 is an idealized graphical presentation of the attenuation vs. frequency relationship developed by a group of three band reject filters, such as used in the "talk" path of each channel of the circuit shown at FIG. 2, the areas under the curve representing the segments or bands of the frequency spectrum which are transmitted to the listener; and FIG. 4 is an idealized graphical presentation of the attenuation vs. frequency relationship developed by a group of three narrow bandpass filters which are in answer path of each channel, the areas under the curve representing the segments or bands of the spectrum which are removed from the answer signal.

Referring now to FIG. 1 in more detail, such figure illustrates a satellite communication system with land lines at both ends. In the circuit condition shown, the communicant at the west terminal is talking to the communicant at the east terminal. The principal source of delay is the propagation time to the satellite from the ground transmitting station and from the satellite. Of course, for each satellite in use two principal earth-to-satellite-and-return paths are involved.

Echoes arise in such a communication system whenever there is a discontinuity or impedance mismatch in the connecting circuits. For example, if the balancing network at the east terminal fails to match the impedance of the connecting two-wire section, some of west's speech energy, which is represented by the heavy line of the upper channel, will return as talker echo. This is indicated in FIG. 1 by the light dash line of the lower channel. If a similar unbalance exists at the west terminal, some of the talker echo, and some of any answer as well, will in turn be reflected back to the east terminal by way of the upper channel as listener echo. This is indicated in FIG. 1 by the light dash and dot line of the upper channel. Higher order reflections also occur, but they are normally too small in magnitude to be of significance.

The communication system shown in FIG. 2 includes echo suppression circuitry 10, 12, according to the present invention, in addition to conventional terminal equipment at the east and west terminals. The delays in the west-east and east-west channels are represented by blocks 14, 16.

The terminal equipment shown in FIG. 2 comprises handsets 18, 20, hybrid coils 22, 24, balance networks 26, 28, and amplifiers 30, 32, all of which are normally associated with conventional telephone handsets. In FIG. 2 the circuit condition shown is with the party W at the west terminal speaking to the party E at the east terminal. The output of the microphone in W's handset 18 feeds hybrid coil 22 which in turn feeds the west-east channel. At least a portion of W's speech is received at the east terminal and amplified by the amplifier 32 before being fed to hybrid coil 24 associated with handset 20. The hybrid coil 24 presents impedances so that very little of the energy coming from the west-east channel amplifier is fed to the east-west channel. It is desirable that all of the energy from amplifier 32 be fed to handset 20 and none to the east-west channel. However, one of the sources of echo is the lack of perfect balance in the hybrid coil allowing some energy to return to the terminal where the speech originated.

The current in the west-east channel generated by W's voice as he speaks into the microphone in his handset 18 is sensed by the speech sensitive relay 34 forming a part of echo suppression circuitry 10. Relay 34 switches switch S1 into the position illustrated, putting the talk path of the echo suppression circuitry into the west-east channel. W's speech wave is then fed to a series array of band reject filters RF1, RF2, **RF*n***, three being shown by way of example, each removing a small portion or band of the frequency spectrum of said speech wave. FIG. 3 graphically illustrates the effect of three band reject filters on the frequency spectrum, the filters being suitably 100 cycles wide and centered on respective frequencies of 800, 1500 and 2000 cycles per second. The areas under the curve represent the portions or bands of the frequency spectrum which are passed, i.e., not materially attenuated. It may be said that the band reject filters RF1, RF2, RF*n* split the frequency spectrum of the talker speech wave into a plurality of passband segments. As will be hereinafter explained in more detail, the attenuated portions of the frequency spectrum are used as the passbands of the answer path of the east-west channel so that the listening party at the east terminal can "double talk" when he pleases and make known his response to, or at least his desire to respond to, the message being received from a west terminal.

As previously mentioned, because of a lack of complete isolation in the hybrid coil 24 and handset 20, and due to impedance mismatches, some of the W's speech signal is fed into the east-west channel as talker echo, indicated by the broken line 38. This talker echo has the same characteristics as the speech signal fed to handset 20, i.e., it does not include the portion of the frequency spectrum removed by the band reject filters RF1, RF2, RF*n* in circuitry 10.

Echo suppression circuitry 12 in the east-west channel is identical to its counterpart circuitry 10. However, when W is talking and E is listening, the speech sensitive relay 40 is not energized and switch S2 is in its position connecting the answer path of such circuitry 12 into the east-west channel. The talker echo 38 is fed to a parallel array of bandpass filters PF1, PF2, PF*n* in the answer path, each such filter being suitably 100 cycles wide and centered on respective frequencies of 800, 1,500 and 2,000 cycles per second. As will be noted, these filters are equal in number and complementary to the band reject filters RF1, RF2, RF*n* in the talk path of the west-east channel, i.e., bandpass filters PF1, PF2, PF*n* are constructed to pass only those segments of the frequency spectrum which correspond to the segments removed by the said band reject filters RF1, RF2, RF*n*. The transmitted portions of the frequency spectrum of the transmitted audio signal fed are thus attenuated in the answer path by the bandpass filters PF1, PF2, PF*n*. As a result, any talker echo signal is completely removed from the east-west signal path.

FIG. 4 graphically illustrates the effect of the bandpass filters PF1, PF2, PF*n* on the frequency spectrum. The areas under the curve represent the portions of the frequency spectrum which such filters pass. It can readily be seen that such portions of the frequency spectrum correspond to the portions of the frequency spectrum which are attenuated by the band reject filters RF1, RF2, RF*n* in the west-east channel. Similarly, the relatively narrow frequency segments, represented by the non-attenuated band in the FIG. 4 curve, are passed by the bandpass filters PF1, PF2, PF*n* and correspond to the portions of the frequency spectrum removed by the band reject filters RF1, RF2, RF*n* (FIG. 3).

Although the bandpass filters PF1, PF2 remove any talker echo, they will pass a small portion of any speech wave originating at the east terminal as an answer by the listener. As is evident, the resultant answer signal received by the west terminal consists of only those portions of the frequency spectrum which the bandpass filters PF1, PF2, PF*n* pass, i.e. the frequency bands represented by the peaks in the FIG. 4 curve. A relatively few frequency components are involved, but enough to produce a recognizable answer signal, at least for such simple messages as "Yes.," "No.," "That's right.," "Uh huh.," etc. This availability of a non-attenuated, non-echoing answer path, even though of relatively low fidelity, enables a listener to inject and convey a thought to the talking party at any time, and does so without subjecting the parties to either the long-distance echo effects, or the distracting total silence characteristic of conventional echo suppression systems.

The answer signal is received at the West terminal and amplified by amplifier 30 and then fed through hybrid coil 22 into the West handset 18. Since the answer signal involves only a relatively few frequency components, its total energy is relatively low particularly as compared with the original speech signal being transmitted to the East terminal. For this reason, the listener echo fed from hybrid coil 22 back into the west-east channel is relatively negligible. But in any event, the listener echo corresponds in frequency to the attenuation ranges of the band reject filters RF1, RF2, RF*n*, and is attenuated by such filters so is not transmitted back to the East terminal where it originated.

Echo suppression circuitry 10 also includes an answer path comprising a parallel array of bandpass filters PF1′, PF2′, PF*n*′, which are identical in construction and operation to the bandpass filters PF1, PF2, PF*n* in the answer path of echo suppression circuitry 12. The echo suppression circuitry 12 further also includes a talk path comprising series array of band reject filters RF1′, RF2′, RF*n*′, which are identical in construction and operation to the said band reject filters RF1, RF2, RF*n* in the talk path of echo suppression circuitry 10.

As in the case of conventional echo suppressors, the talk path is "captured" by the party speaking, or by the party speaking the loudest when both parties are speaking at the same time. When both parties are speaking at the same time the signal responsive relays 34, 40 compare the relative strengths of the speech signals fed into the respective channels and connect the talk path into the channel receiving the stronger signal and the answer path in the channel receiving the weaker signal, or no signal at all. Signal responsive relays 34, 40, and the associated diodes shown in FIG. 2, are suitably of a type conventional per se, such as are used in so-called discrete loss type echo suppression systems, as discused in the above-mentioned Gardner et al. article at p. 1763, and shown at FIG. 2 thereof.

From the foregoing, various further modifications, arrangements, adaptations, and modes of utilization of the invention will be apparent, within the scope of the following claims.

What is claimed is:

1. In a two-way speech communications system involving substantial transmission times between communications terminals, and wherein respective signal transmission and signal receiving paths are associated with said communications terminals with such respective signal paths being nominally isolated from each other by respective hybrid coils in circuit with said terminals, the improvement in echo suppression circuitry, comprising; signal level responsive switching means associated with each said terminal establishing its signal path in a transmit condition when the signal generated at said terminal is stronger than the signal received at said terminal and in a receive condition when such received signal is the stronger, each said signal path in its transmit condition at all times including signal passband limiting means passing from about 80% to about 95% of the frequency components of the speech signal applied thereto and blocking the balance of the applied signal frequency components, and each said signal path in its receive condition at all times including passband limiting means passing about 20% to about 5% of the frequency components of the speech signal applied thereto and blocking the balance of the applied signal frequency components, the signal components passed by each signal path in its transmit condition being essentially the signal components blocked by each signal path in its receive condition.

2. A speech communications system according to claim 1, wherein said passband limiting means comprise a series array of narrow band reject filters in each signal path circuit in its transmit condition, and a parallel array of narrow bandpass filters in each signal path circuit in its receive condition.

3. A speech communications system according to claim 1, wherein each signal path in its receive condition comprises several passbands, each of a width of about 50 to 100 cycles, said passbands being rather widely separated from each other in the voice spectrum.

4. A speech communications system according to claim 3, wherein the center frequency of each said passband is at a frequency greater than about 600 cycles per second.

5. A speech communications system according to claim 4, wherein the passband center frequencies are not harmonically related.

6. A speech communications system according to claim 5, wherein three said passbands are employed, respectively centered on frequencies of about 800, about 1500 and about 2000 cycles per second.

7. In a two-way speech communications system involving substantial transmission times between communications terminals, and wherein respective signal transmission and signal receiving paths are associated with said communications terminals with such respective signal paths being nominally isolated from each other by respective hybrid coils in circuit with said terminals, the improvement in echo suppression circuitry, comprising; signal level responsive switching means associated with each said terminal establishing its signal path in a transmit condition when the signal generated at said terminal is stronger than the signal received at said terminal and in a receive condition when such received signal is the stronger, each said signal path in its transmit condition at all times including signal passband limiting means passing at least about two-thirds of the frequency components of the speech signal applied thereto and blocking at least some of the applied signal frequency components, and each said signal path in its receive condition at all times including passband limiting means passing less than about one-third of the frequency components of the speech signal applied thereto and blocking the balance of the applied signal frequency components, the signal components passed by each signal path in its transmit condition essentially including the signal components blocked by each signal path in its receive condition.

References Cited

UNITED STATES PATENTS

| | | | |
|---|---|---|---|
| 2,251,276 | 8/1941 | Fisher | 179—170.8 |
| 3,128,353 | 4/1964 | Gardner | 325—65 X |
| 3,175,051 | 3/1965 | Cutler | 179—170.2 |

JOHN W. CALDWELL, *Primary Examiner.*

DAVID G. REDINBAUGH, *Examiner.*

B. V. SAFOUREK, *Assistant Examiner.*